United States Patent
Webb et al.

(10) Patent No.: US 10,367,261 B2
(45) Date of Patent: Jul. 30, 2019

(54) BASE STATION ANTENNAS WITH REMOTELY RECONFIGURABLE ELECTRONIC DOWNTILT CONTROL PATHS AND RELATED METHODS OF RECONFIGURING SUCH ANTENNAS

(71) Applicant: CommScope Technologies LLC, Hickory, NC (US)

(72) Inventors: Bobby W. Webb, Allen, TX (US); Shirley Forsythe, Sachse, TX (US); William G. Sarver, Jr., Plano, TX (US)

(73) Assignee: CommScope Technologies LLC, Hickory, NC (US)

( * ) Notice: Subject to any disclaimer, the term of this patent is extended or adjusted under 35 U.S.C. 154(b) by 221 days.

(21) Appl. No.: 15/606,013

(22) Filed: May 26, 2017

(65) Prior Publication Data

US 2017/0365921 A1    Dec. 21, 2017

Related U.S. Application Data

(60) Provisional application No. 62/351,445, filed on Jun. 17, 2016.

(51) Int. Cl.
*H04B 1/16*     (2006.01)
*H04W 24/02*    (2009.01)
(Continued)

(52) U.S. Cl.
CPC ............ *H01Q 3/005* (2013.01); *H01Q 3/36* (2013.01); *H04B 1/40* (2013.01); *H04W 24/02* (2013.01); *H04W 88/08* (2013.01); *H04W 88/085* (2013.01)

(58) Field of Classification Search
CPC ......... H04B 1/40; H04B 1/202; H04W 24/02; H04W 88/085; H04W 88/08; H01Q 3/005; H01Q 3/2605; H01Q 3/36
See application file for complete search history.

(56) References Cited

U.S. PATENT DOCUMENTS

| | | | | |
|---|---|---|---|---|
| 9,654,231 | B1 * | 5/2017 | Marupaduga | H04B 15/005 |
| 2002/0075890 | A1 * | 6/2002 | Kim | H04J 3/047 |
| | | | | 370/442 |

(Continued)

FOREIGN PATENT DOCUMENTS

| | | |
|---|---|---|
| CN | 102780090 | 11/2012 |
| CN | 104170438 | 11/2014 |

(Continued)

OTHER PUBLICATIONS

"Antenna Interface Standards Group, Standard No.AISG v2.0. Control interface for antenna line dev", Internet Citation, Jun. 13, 2006, XP008131526, Retrieved from the Internet: URL: http://www.torni.fi/aisg/AISG%20v2.0%20.pdf [Retrieved on Jan. 13, 2011].

*Primary Examiner* — Andrew Wendell
(74) *Attorney, Agent, or Firm* — Myers Bigel, P.A.

(57) ABSTRACT

Methods of configuring base station antennas are provided in which reconfiguration data is transmitted to a controller of the antenna from a remote location. Connections between a plurality of remote electronic tilt (RET) units that are mounted within the antenna and a plurality of control ports of the antenna are then reconfigured in response to receipt of the reconfiguration data.

18 Claims, 6 Drawing Sheets

(51) Int. Cl.
*H01Q 3/00* (2006.01)
*H01Q 3/36* (2006.01)
*H04B 1/40* (2015.01)
*H04W 88/08* (2009.01)

(56) References Cited

U.S. PATENT DOCUMENTS

| | | | |
|---|---|---|---|
| 2011/0105099 A1* | 5/2011 | Roll | H04L 67/025 |
| | | | 455/418 |
| 2012/0264459 A1* | 10/2012 | Johansson | H04W 24/00 |
| | | | 455/457 |
| 2015/0327087 A1* | 11/2015 | Xu | H04W 64/003 |
| | | | 455/424 |
| 2016/0135062 A1* | 5/2016 | Lee | H04W 24/02 |
| | | | 370/252 |
| 2016/0141752 A1 | 5/2016 | Xu et al. | |
| 2016/0380348 A1 | 12/2016 | Li et al. | |
| 2016/0380821 A1 | 12/2016 | Liu et al. | |
| 2017/0170549 A1* | 6/2017 | Buondelmonte | H01Q 1/246 |
| 2017/0207527 A1* | 7/2017 | Lee | H01Q 1/084 |
| 2017/0244157 A1 | 8/2017 | Muehlbauer et al. | |
| 2017/0265090 A1 | 9/2017 | Lee et al. | |
| 2017/0365923 A1* | 12/2017 | Schmutzler | F16H 25/20 |

FOREIGN PATENT DOCUMENTS

| | | |
|---|---|---|
| CN | 104969602 | 10/2015 |
| CN | 104995941 | 10/2015 |
| CN | 107093797 | 8/2017 |
| DE | 102016001912 | 8/2017 |
| EP | 3107152 | 12/2016 |
| EP | 3109938 | 12/2016 |
| EP | 3208886 | 8/2017 |
| WO | WO2015135109 | 9/2015 |

\* cited by examiner

BASE STATION ANTENNAS WITH REMOTELY RECONFIGURABLE ELECTRONIC DOWNTILT CONTROL PATHS AND RELATED METHODS OF RECONFIGURING SUCH ANTENNAS

CROSS-REFERENCE TO RELATED APPLICATION

The present application claims priority under 35 U.S.C. § 119 to U.S. Provisional Patent Application Ser. No. 62/351,445, filed Jun. 17, 2016, the entire content of which is incorporated herein by reference as if set forth in its entirety.

BACKGROUND

Base station antennas for cellular communications systems typically include one or more linear arrays of radiating elements such as dipoles that are mounted on, for example, a flat panel. Each array of radiating elements may produce an antenna beam that has desired characteristics such as, for example, a desired beam elevation angle, beam azimuth angle, and/or half power beam width in order to provide cellular service to a specified coverage area. A signal that is to be transmitted by one of the linear arrays of such a base station antenna is divided into multiple sub-components, and each sub-component may be fed through an antenna feed network to a respective one of the radiating elements.

Based on network coverage requirements, cellular operators may find it advantageous to adjust the vertical elevation angle (i.e., the vertical angle of the antenna with respect to the horizon) or "tilt" of the main beam of a linear array in order to change the coverage area of the antenna. Such adjustment is typically referred to as "down-tilting" as the antenna beam is typically tilted to point at an elevation angle of 0° or less with respect to the horizon such as, for example, an elevation angle of 0° to −10°. The base station antenna may be electronically down-tilted by controlling the phases of the sub-components of the signal that are transmitted through the respective radiating elements of the linear array that forms the antenna beam in a manner that changes the elevation angle of the main antenna beam. Such electronic down-tilt is typically performed by transmitting a control signal from a remote location to the base station antenna. In response to this control signal, the base station antenna adjusts settings of adjustable phase shifters that are included in the antenna feed network to implement the phase shifts that down-tilt the main beam of the linear array at issue.

Electromechanical phase shifters are typically used to implement the adjustable phase shifters that are used to electronically down-tilt the antenna beams of the linear antennas. An example of such an electromechanical phase shifter is the wiper arc phase shifter disclosed in U.S. Pat. No. 7,463,190. The phase shifter of the '190 patent has a stationary "main" printed circuit board and a mechanically rotatable "wiper" printed circuit board mounted thereon. The main printed circuit board has an input, a relatively large number (e.g., five, seven or nine) of outputs, and a plurality of arced transmission paths that connect to the respective outputs. The arced transmission paths are arranged as concentric arcs having different radii, and hence each arced transmission path has a different length. An RF signal that is input at the input of the phase shifter is split into sub-components and at least some of these sub-components are transferred to the wiper printed circuit board, where they capacitively couple onto the respective arced transmission paths on the main printed circuit board. In this fashion, the outputs of the phase shifter may be coupled to the input by respective RF transmission paths that have different lengths. Since the length of a transmission path effects the phase of an RF signal transmitted therethrough, the different length RF transmission paths may apply a linear phase taper to the sub-components of the input RF signal. Moreover, the amount of phase shift applied to each sub-component of the input RF signal may be adjusted by mechanically moving the wiper printed circuit board to change the position along the arced transmission paths where the wiper printed circuit board capacitively couples to the main printed circuit board. Each of the outputs of the phase shifter may be connected to a respective one of the radiating elements or to a respective sub-groups of radiating elements of the linear array so that a linear phase taper may be applied to the radiating elements (or sub-groups thereof).

Base station antennas that use electromechanical phase shifters typically include a plurality of Remote Electronic Tilt (RET) units that are used to move the wiper printed circuit boards of the phase shifters. Each RET unit may include one or more motors such as direct current (DC) motors or stepper motors. In some cases a motor may be shared over multiple RET units. Mechanical linkages connect each motor to a respective one of the phase shifters (or to two of the phase shifters when dual polarized radiating elements are used, as the same phase shift is typically applied to the signals of each polarization) so that the motors may be used to move the wiper boards of the phase shifters. The electrical down-tilt is effected by sending a control signal to the base station antenna. This control signal is transmitted over an Antenna Interface Standards Group (AISG) control channel to a RET controller included in the base station antenna. The RET controller includes software that decodes and processes AISG commands that are included in the AISG control signal and, in response thereto, transmits control signals to the individual RET units. The control signals transmitted by the RET controller to an individual RET unit may activate a motor of the RET unit to drive a mechanical linkage to adjust an associated electromechanical phase shifter to apply a desired phase taper to the radio frequency (RF) signals input thereto. Thus, a RET unit is a device that is used to physically adjust a phase shifter of the base station antenna while the RET controller is a unit that receives AISG commands and controls one or more RET units in response thereto.

SUMMARY

Pursuant to some embodiments, methods of configuring base station antennas are provided in which reconfiguration data is transmitted to a controller of the antenna from a remote location. Connections between a plurality of RET units that are mounted within the antenna and a plurality of control ports of the antenna are then reconfigured in response to receipt of the reconfiguration data.

In some embodiments, the reconfiguration data may be contained within a data file attached to an antenna control signal such as, for example, an AISG 2.0 command. In some embodiments, the antenna control signal may be AISG 2.0 command number 0x32 and/or an AISG 2.0 command number 0x89.

In some embodiments, the reconfiguration data may be transmitted to the controller of the antenna through an Antenna Interface Standards Group Primary.

In some embodiments, the remote location may be a network operator network control center.

In some embodiments, the control ports may be RS-485 connectors.

In some embodiments, the remote location may be the bottom of a tower on which the antenna is mounted.

In some embodiments, the controller may be a RET controller that controls operation of the RET units.

In some embodiments, the authenticity of the antenna control signal may be validated prior to reconfiguring the connections between the motorized RET units and the control ports.

Pursuant to further embodiments of the present invention, base station antennas are provided that include a first linear array of radiating elements, a second linear array of radiating elements, a first phase shifter having outputs that are coupled to respective individual or sub-groups of the radiating elements of the first linear array, a second phase shifter having outputs that are coupled to respective individual or sub-groups of the radiating elements of the second linear array, a plurality of control ports, a first RET unit, a second RET unit and a RET controller, the RET controller configured to receive an AISG control signal and reconfigure at least one of a first control path between the first RET unit and the plurality of control ports and a second control path between the second RET unit and the plurality of control ports in response thereto.

In some embodiments, the RET controller may be an integrated circuit chip having a plurality of output pins, and the RET controller may be coupled to each of the control ports through the output pins.

In some embodiments, the control ports may be RS-485 connectors.

In some embodiments, the AISG control signal may be an Antenna Interface Standards Group (AISG) 2.0 command such as, for example, AISG 2.0 command number 0x32, AISG 2.0 command number 0x89 or AISG 2.0 command numbers 0x40, 0x41 and 0x42.

In some embodiments, at least one of the control ports may be a control output port of a smart bias tee.

In some embodiments, the first and second RET units may share a common motor.

In some embodiments, the plurality of RET units may be integrated as a composite unit that includes a shared motor.

DETAILED DESCRIPTION

Figure 1:
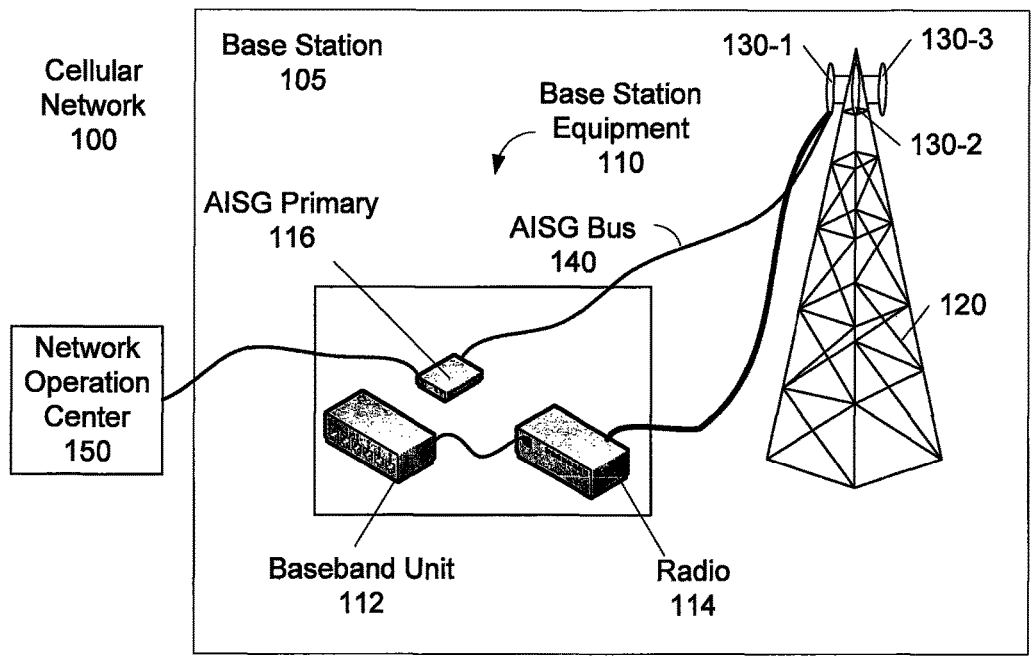
FIG. 1 is a schematic diagram illustrating various elements of a cellular communications network that may be used to control equipment at a cellular base station thereof.

Pursuant to embodiments of the present invention, base station antennas are provided that have control paths (i.e., communications connections for control signals) between a plurality of remote electronic tilt (RET) units and a plurality of control ports on the antenna that can be reconfigured from a remote location. The ability to reconfigure these control paths may provide flexibility to network operators as they introduce new frequency bands, types of service and the like, and also in cases where multiple network operators use different parts of the same base station antenna. Moreover, as the base station antennas according to embodiments of the present invention may be reconfigured remotely, the antenna reconfiguration can be performed without a costly tower climb as is the case with conventional "reconfigurable" antennas.

As discussed above, many base station antennas have electronic down-tilting capabilities. The electronic down-tilting is accomplished by controlling a plurality of RET units, where each RET unit drives an electromechanical phase shifter to apply a phase taper to a linear array of radiating elements. The RET units are controlled by one or more AISG controllers (an AISG controller is usually referred to as an "AISG Primary"), which are typically either implemented as part of the baseband equipment (when the radios are at the base of the antenna tower) or as part of a remote radio head. Conventionally, a base station antenna would have one or two control ports (i.e., a connector on the antenna that receives control signals), and each RET unit would be controlled through a specific one of the control ports. For example, a single control port might be provided that is used to control all of the RET units, or two control ports might be provided with the RET unit for a first linear array controlled through the first of the control ports, and the RET unit for a second linear array controlled through the second control port.

The above-described arrangement may lead to problems. For example, a base station antenna might originally be configured so that all of the RET units are controlled through a single control port. Subsequently, it may become necessary to upgrade or reconfigure the base station, and as part of the reconfiguration it may be necessary or desirable to have some of the RET units controlled through a first control port, and other of the RET units controlled through a different control port. Such a situation could occur, for example, if the network operator decides to lease one or more of the linear arrays on the base station antenna to another network operator, as in this case each network operator would require its own AISG Primary to control the RET units for its respective linear arrays on the base station antenna. In this example, since the originally installed base station antenna only had a single control port, such reconfiguration is not possible. While a potential solution to this problem would be to initially install a base station antenna having two (or more) control ports that control different subsets of the RET units on the antenna, this is not a viable option if only one AISG Primary is initially available for use with the antenna.

In light of these difficulties, base station antennas have been introduced that are reconfigurable so that any of the RET units can be controlled through any of the control ports by reconfiguring software in the antenna. Such a capability is often referred to as a "site sharing" or "antenna sharing" capability. The configuration between the RET units and the control ports is initially set at the factory at the time that the antenna is manufactured, but can be changed later in the field. However, to implement this change, it is necessary for a technician to directly connect a computer to the antenna, which means that a "tower climb" by a technician is typically required to implement the configuration change. Such tower climbs are both expensive and inconvenient.

The base station antennas according to embodiments of the present invention can be reconfigured remotely so that any of the RET units therein may be connected to any of the control ports. In some embodiments, this capability is provided by using one or more specific commands in the AISG 2.0 protocol command set, namely Command No. 0x32 and/or Command No. 0x89, to upload a new control port configuration to the antenna. In other embodiments, the software download sequence defined in AISG 2.0, which is a sequence of three separate AISG commands (namely Command Nos. 0x40, 0x41 and 0x42) may be used to change the defined configuration between the RET units and the control ports. In each case, a network operator can reconfigure the RET unit to control port configuration either from the cellular base station or from a remote location such as a network operating center. Thus, the base station antennas according to embodiments of the present invention may be quickly and easily reconfigured as necessary. The same process used for remote reconfiguration of the antenna may also be used for the initial configuration of the antenna at the factory.

Aspects of the present invention will now be described in greater detail with reference to the figures, in which embodiments of the present invention are shown. Before discussing these embodiments in detail, it is helpful to consider the AISG control paths between the RET units and the control ports on various conventional base station antennas.

In particular, FIG. 1 is a schematic diagram illustrating various elements of a cellular communications network 100 that may be used to control equipment at a cellular base station 105 thereof. As shown in FIG. 1, a cellular base station 105 includes base station equipment 110 such as a plurality of baseband units 112, a plurality of radios 114, and one or more AISG Primaries 116. The base station 105 may also include a plurality of base station antennas 130 that may be mounted on a raised structure such as an antenna tower 120. Other equipment (not shown) such as, for example, a power supply, back-up batteries, a power bus and the like also will typically be provided. Only one baseband unit 112, radio 114 and AISG Primary 116 are illustrated in FIG. 1 to simplify the drawing, but it will be appreciated that at least one of these components (and typically more) will be provided for each antenna 130 that is part of the cellular base station 105.

As is known to those of skill in the art, the baseband unit 112 may receive data from another source such as, for example, a backhaul network (not shown) and may process this data and provide a data stream to the radio 114. Each radio 114 may generate RF signals that include the data encoded therein and may amplify and deliver these RF signals to an associated one of the antennas 130 for transmission via a cabling connection. Moreover, while FIG. 1 depicts a cellular base station 105 in which the radios 112 are located at the bottom of the antenna tower 120, it will be appreciated that some or all of the radios 114 may be provided in the form of tower mounted remote radio heads that are mounted close to the antennas 130 on the mounting structure 120. The cellular network 100 further includes a network operation center 150 that is remote from the cellular base station 105 that may be in communication with equipment at the cellular base station 105.

As noted above, the cellular base station further includes an AISG Primary 116, which may comprise a standalone unit, may be integrated into the baseband unit 112 or may integrated into the radio 114 (which is typically the case when the radio 114 comprises a tower-mounted remote radio head). The AISG Primary 116 may generate control signals that are used to control the operation of various of the electronic units (not shown) that are separately mounted on the tower 120 such as tower mounted amplifiers, gimballing systems (if any) for the antennas 130 and/or external RET units, as well as various internal components of the antennas 130. The commands issued by the AISG Primary 116 may comply with an industry standardized control scheme known as the AISG 2.0 protocol that specifies formats and other parameters of the AISG commands so that tower mounted equipment manufactured by different entities can all be controlled through a single, integrated controller. The AISG Primary 116 may be connected to a control port on one of the antennas 130 via an AISG/3GPP bus 140. The AISG/3GPP bus 140 may be implemented, for example, as a control signal cable.

Figure 2A:
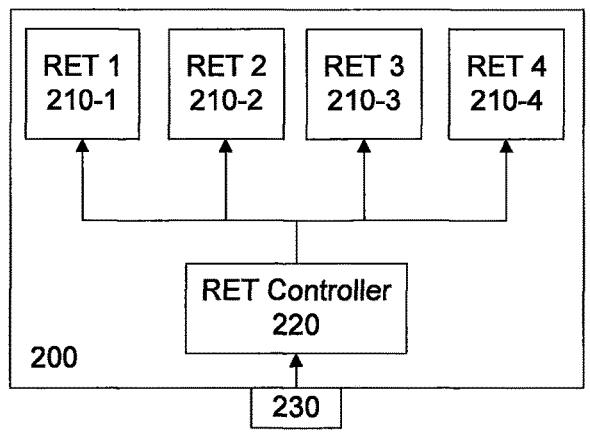
FIGS. 2A-2B are schematic block diagrams of the connections between the control ports and RET units in two conventional base station antennas.

FIG. 2A is a schematic block diagram of a portion of a conventional base station antenna 200 that is used for processing remote electronic down-tilt commands that are sent to the antenna 200. As shown in FIG. 2A, in this particular conventional design, the antenna 200 includes four RET units 210-1 through 210-4 and a RET controller 220. The RET controller 220 is coupled to a control port 230. The AISG/3GPP bus 140 may connect the AISG Primary 116 (see FIG. 1) to the control port 230. AISG commands, such as commands for controlling the RET units 210 may be received by the RET controller 220 from the AISG Primary 116 over the communication path comprising the AISG/3GPP bus 140 and the control port 230.

The RET controller 220 may include software that processes AISG commands and in response thereto, transmits control signals to the individual RET units 210 to control the operation thereof. For example, the RET controller 220 may receive an AISG command and in response thereto may control one of the RET units (e.g., RET unit 210-2) to actuate the motor thereof to effect an electronic down-tilt on one of the linear arrays (not shown) of the base station antenna 200. In the particular example shown in FIG. 2A, all of the RET units 210 are controlled by a single RET controller 220 through a single control port 230. In this example, a single AISG Primary 116 would be used to control all of the RET units 210 on the antenna 200.

Figure 2B:
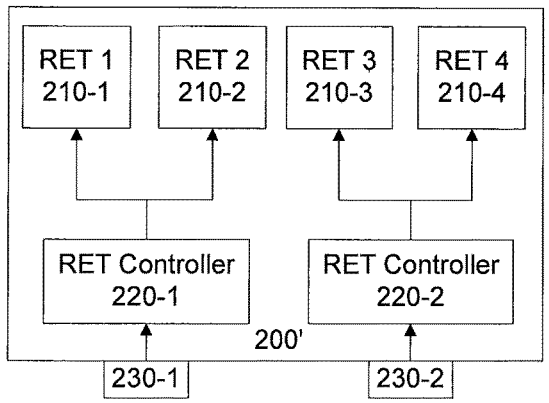

FIG. 2B is a schematic block diagram of a portion of another base station antenna 200' that is used for processing remote electronic down-tilt commands that are sent thereto. As is readily apparent, the antenna 200' of FIG. 2B differs from the antenna 200 of FIG. 2A in that the antenna 200' includes two RET controllers 220-1 and 220-2 and two control ports 230-1, 230-2 instead of the single RET controller 220 and single control port 230. In base station antenna 200', each RET controller 220 controls two of the RET units 210. Each control port 230 would be coupled to a separate external AISG Primary 116. Thus, the antenna 200' may provide increased flexibility for the control of the internal RET units 210 thereof. However, the antenna 200' may not be suitable for use at a cellular base station that, for example, only, has a single AISG Primary 116 for the antenna 200'.

The control paths between the internal RET units 210 and the control port(s) 230 in the antennas 200, 200' of FIGS. 2A and 2B are fixed, and hence in the antennas 200 and 200' the internal RET units 210 cannot be reconfigured to have different control path connections.

Figure 3:
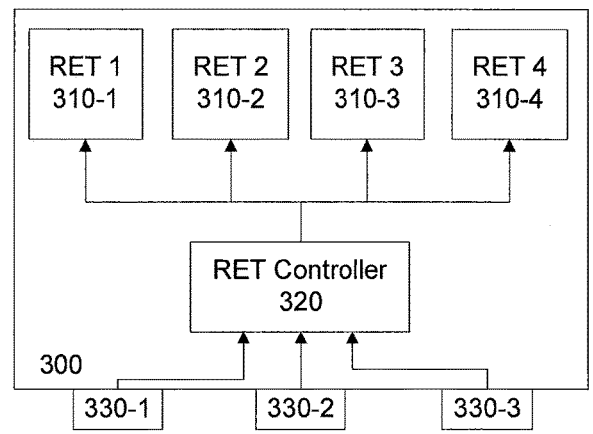
FIG. 3 is a schematic block diagram of the connections between the control ports and RET units in a base station antenna according to embodiments of the present invention.

FIG. 3 is a schematic block diagram of the connections between the control ports and RET units in a base station antenna 300 according to embodiments of the present invention. The base station antenna 300 has the capability to change the control port associated with each RET unit thereof.

Figure 4A:
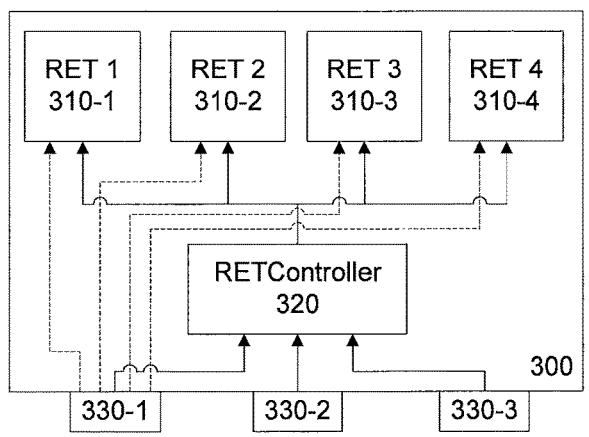
FIGS. 4A-4C are schematic block diagrams illustrating three example ways in which the base station antenna of FIG. 3 may be reconfigured using the techniques according to embodiments of the present invention.
Figure 4B:
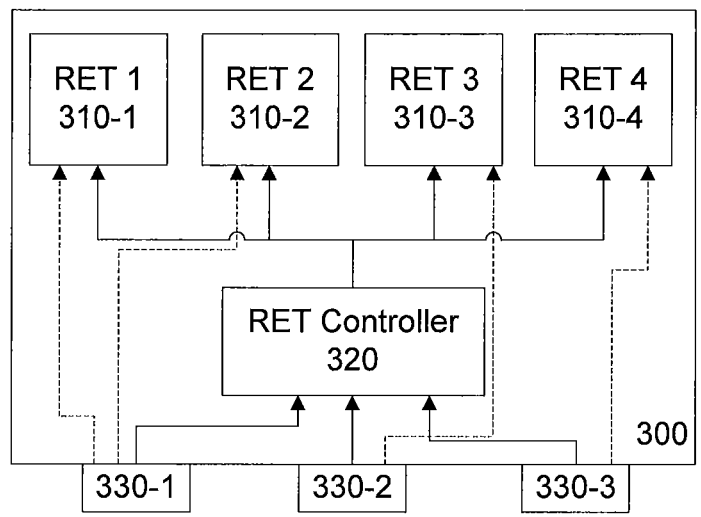
Figure 4C:
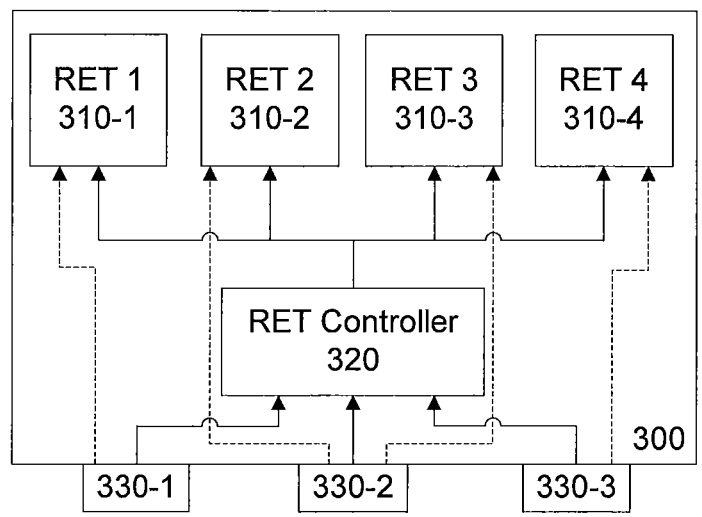

In particular, as shown in FIG. 3, the antenna 300 includes four RET units 310-1 through 310-4, a single RET controller 320, and three control ports 330-1 through 330-3. The RET controller 320 is coupled to all three control ports 330. The RET controller 320 may include software that routes control signals received at specific ones of the control ports 330 to specific ones of the RET units 310. FIGS. 4A-4C illustrate several potential configurations that the RET controller 320 may be programmed to implement.

Specifically, as shown by the dotted lines in FIG. 4A, in a first configuration, the RET controller 320 may be configured to route control signals received at the first control port 330-1 to all four of the RET units 310. Control signals (if any) received at the other two control ports 330-2, 330-3 would not be processed. This configuration might be used, for example, when only a single AISG Primary is available for controlling the antenna 300.

As shown by the dotted lines in FIG. 4B, in a second configuration, the RET controller 320 may be configured to route control signals received at the first control port 330-1 to RET units 310-1, 310-2, to route control signals received at the second control port 330-2 to RET unit 310-3, and to route control signals received at the third control port 330-3 to RET unit 310-4. As shown by the dotted lines in FIG. 4C, in a third configuration, the RET controller 320 may be configured to route control signals received at the first control port 330-1 to RET unit 310-1, to route control signals received at the second control port 330-2 to RET unit 310-2, 310-3, and to route control signals received at the third control port 330-3 to RET unit 310-4.

Pursuant to some embodiments of the present invention, the connections of the RET units 310 to the control ports 330 may be reconfigured by configuring the antenna 300 to interpret certain commands in the AISG 2.0 protocol in an unconventional manner. In particular, Command No. 0x32 and Command No. 0x89 in the AISG 2.0 protocol were designed to allow a network operator to configure an external RET unit. Previously, RET units were more typically separate structures from a base station antenna that could be mounted external to the antenna such that each RET unit could move a mechanical linkage that was accessible from outside the antenna. Since the internal designs of the base station antennas could differ, it was necessary to "configure the RET," which involved programming the RET unit to specify the relationship between a fixed amount of movement to the mechanical linkage (e.g., 1 mm of movement) and the amount of phase shift that this would result in. AISG Command Nos. 0x32 and 0x89 were particularly useful in situations where a base station antenna was later upgraded to include an external RET unit.

When RET units are implemented as an internal component of the antenna, the relationship between the physical movement of the RET units and the resulting amount of phase shift that this movement will generate is known and this relationship may be pre-programmed into the antenna (e.g., into the RET controller thereof). Consequently, base station antennas that include internal RET units generally have no need for AISG Command Nos. 0x32 and 0x89, would not expect to receive an AISG Command Nos. 0x32 and/or 0x89, and could be programmed to ignore AISG Command Nos. 0x32 and 0x89. Thus, pursuant to embodiments of the present invention, base station antennas may be provided that have RET controllers that are programmed to receive AISG Command Nos. 0x32 and/or 0x89 and to use information included in these commands to reconfigure the connections between the control ports and the RET units.

In one embodiment, network operators may be provided a software application that will allow the network operator to create a configuration file that may be used to reconfigure a base station antenna according to embodiments of the present invention. In creating this configuration file the network operator may be able to specifically select the control paths between the control ports and the RET units. The network operator may then attach this configuration file as the payload of an AISG Command No. 0x32 and/or an AISG Command No. 0x89 to upload the configuration file to the antenna. The RET controller on the antenna may parse the uploaded configuration file to confirm that it contains a valid command and, if so, to reconfigure the connections between the control ports and the RET units on the antenna in the manner specified in the configuration file. The network operator may send this reconfiguration file to the antenna from a remote location including, for example, from the base station equipment located at the bottom of an antenna tower or from a network operations center.

While AISG Command Nos. 0x32 and 0x89 may be used in some embodiments to reconfigure the connections between the control ports and the RET units on an antenna, it will be appreciated that embodiments of the present invention are not limited thereto. For example, in other embodiments, the AISG 2.0 software download sequence may be used to upload a new configuration file to the antenna. Pursuant to the AISG 2.0 standard, the steps for a software download are as follows:

1) AISG Command No. 0x40 (Download Start Command), which puts the RET controller in a software download mode. This command carries no payload.
2) AISG Command No. 0x41 (Download Application), which is repeated 1–n times to transport a payload to the RET controller.
3) AISG Command No. 0x42 (Download End), which signals completion of the download sequence and triggers a reset of the RET controller to begin using the newly downloaded software. This command carries no payload.

Pursuant to embodiments of the present invention, the above-described AISG software download sequence may be used to transport a software reconfiguration to the RET controller instead of a normal AISG software package payload. A flag may be set in the header for the payload attached to the Download Application command (AISG Command No. 0x41) that notifies the RET controller that the payload is an antenna sharing configuration as opposed to a normal AISG software package payload. Only a single Download Application command (AISG Command No. 0x41) may be required to deliver the antenna sharing configuration information to the RET controller. After the antenna sharing configuration information has been received by the RET controller and applied the RET controller may initiate a reset in response to the Download End command (AISG Command No. 0x42) and that the new configuration will then apply going forward. The use of the AISG 2.0 software download sequence for reconfiguring the connections between the control ports and the RET units on an antenna may be advantageous because some AISG primaries do not support the full AISG 2.0 command set and hence may not support the AISG 0x32 and/or 0x89 commands, whereas the software download sequence is more widely supported.

Figure 5:
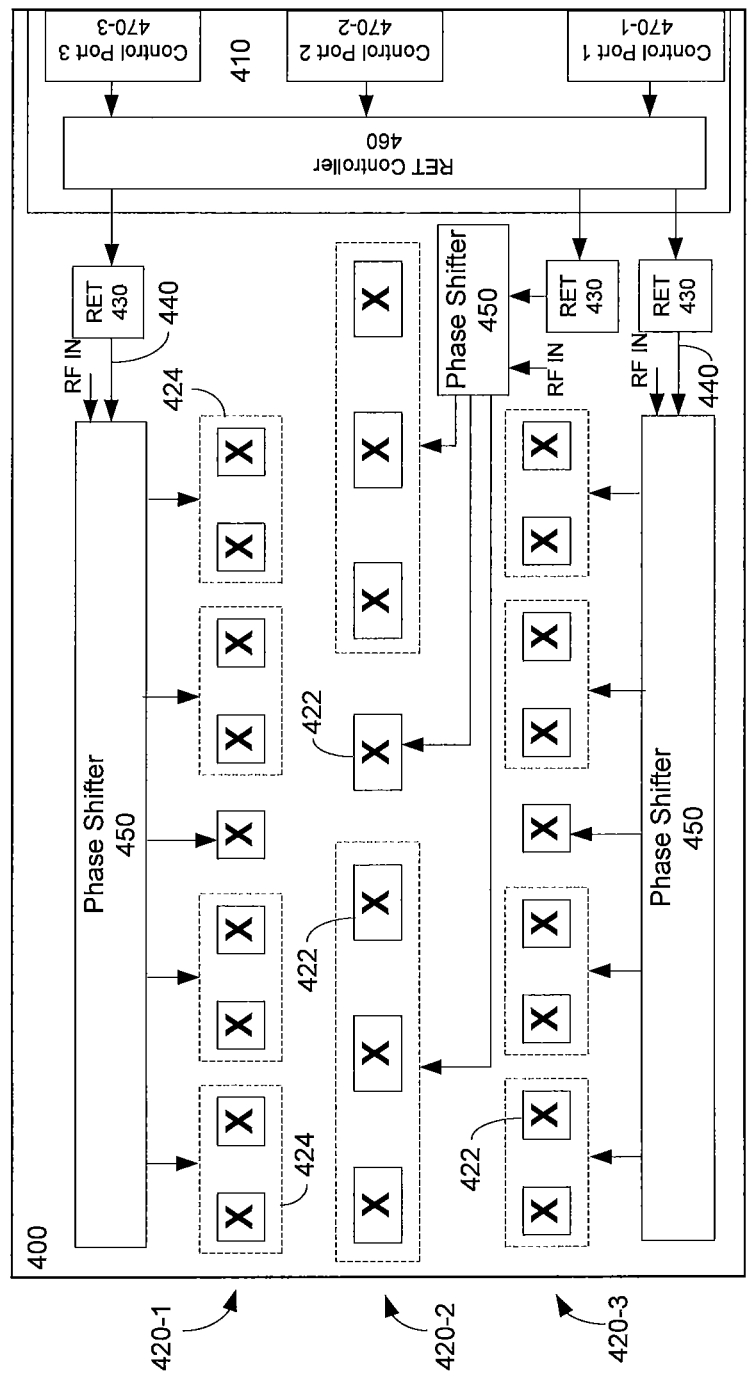
FIG. 5 is a more detailed schematic block diagram of a base station antenna according to embodiments of the present invention.

FIG. 5 is a more detailed schematic block diagram of a base station antenna 400 according to embodiments of the present invention.

As shown in FIG. 5, the base station antenna 400 includes three linear arrays of radiating elements 420-1, 420-2, 420-3. Note that herein, when a figure includes multiple instances of an element, these elements may be referred to individually by their full reference number (e.g., the linear array 420-2) and collectively by the first part of their reference number (e.g., the linear arrays 420). Each linear array 420 includes a plurality of radiating elements 422. While the linear arrays 420 extend horizontally in FIG. 5, it will be appreciated that the base station antenna 400 will typically be rotated 90 degrees from the orientation shown in FIG. 5 when mounted on an antenna tower or other structure so that the linear arrays 420 comprises vertical arrays of radiating elements 422.

Each radiating element 422 may comprise, for example, a pair of 45°/−45° cross-polarized dipole antennas, although embodiments of the present invention are not limited thereto. Different types of radiating of radiating elements 422 may be used in different of the linear arrays 420. In the example base station antenna 400 depicted in FIG. 5, two "high band" linear arrays 420-1, 420-3 are provided that operate in a higher frequency range (e.g., PSC service). Each high band linear array 420-1, 420-3 includes radiating elements 422 that are a first type of cross-dipole arrangement. The antenna 400 further includes a "low band" linear array 420-2 which operates in a lower frequency range (e.g., LTE service). The low band linear array 420-2 includes cross-dipole radiating elements that may have a different shape and/or construction than the radiating elements 422 of the high band linear arrays 420-1, 420-3. It will be appreciated that a wide variety of different types and configurations of radiating elements 422 may be used. For example, in other embodiments, single dipole or patch radiating elements may be used in at least some of the linear arrays 420. It will also be appreciated that more or fewer linear arrays 420 may be provided, and/or that one or more of the linear arrays 420 may be replaced by two-dimensional arrays in some cases.

Linear arrays 420-1 and 420-3 in base station antenna 400 may be identical in some embodiments. In the depicted embodiment, linear arrays 420-1 and 420-3 each include a total of nine radiating elements 422. Eight of the radiating elements 422 in each linear array 420-1, 420-3 are grouped into pairs or "sub-groups" 424 of two radiating elements 422 each. Each radiating element 422 in a sub-group 424 may transmit and receive the same signals. Grouping multiple radiating elements 422 (typically two or three) into sub-groups 424 may reduce the number of diplexers, ports on the phase shifters and the like that are required for proper operation of the base station antenna 400, and hence can reduce the size, weight and cost of the base station antenna 400 at the expense of a reduction in the ability to finely control the beam patterns of the linear arrays 420.

Figure 8:
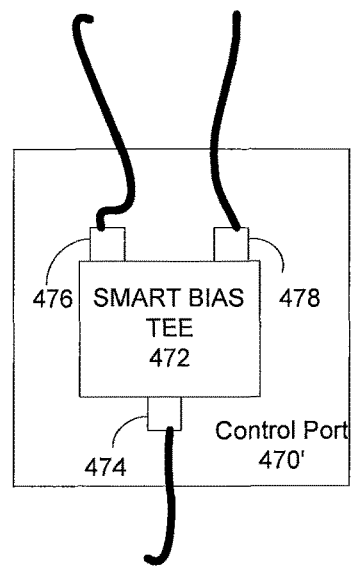
FIG. 8 is a schematic block diagram of a control port implementation in which a smart bias tee is used to extract control signals from an RF cable.

The base station antenna 400 further includes a plurality of RET units 430, mechanical linkages 440 and phase shifters 450. The RET units 430 are controlled by a RET controller 460. The base station antenna 400 also includes three control ports 470-1, 470-2, 470-3. Each control port 470 may comprise, for example, an RS-485 connector or an RF connector in conjunction with a smart bias tee that separates low frequency control signals from the RF data signals. In the depicted embodiment, the control ports comprise RS-485 connectors. FIG. 8 illustrates an alternative control port implementation in which a smart bias tee is used to extract control signals from an RF cable. As shown in FIG. 8, the control port 470' comprises a smart bias tee 472 that has an input 474 that connects to an RF cable, an RF output 476 and a control output 478. The control output 478 may, for example, comprise an RS-485 connector and the input 474 and the RF output 476 may comprise, for example, 50 ohm coaxial connectors. The smart bias tee may separate AISG control signals from the RF signals and route the AISG control signals to the control output 478. A control port 470' may be used in place of each of the control ports 470-1 through 470-3 of FIG. 5, with the control output 478 of each control port 470' connecting to the RET controller 460.

As shown in FIG. 5, each phase shifter 450 may include an input port (labelled RF IN) and a plurality of output ports. The input port of each phase shifter 450 may be connected to an RF input port on the antenna 400. These RF input ports are not shown to simplify the figure. Additionally, it will be appreciated that since cross-polarized radiating elements are used, each linear array 420 will have two associated RF input ports and two associated phase shifters 450, only one of which is shown in FIG. 5 to again help simplify the drawing. Typically, a single RET unit 430 will be used to actuate the wiper arms on both electromechanical phase shifters 450 that are associated with the linear array 420, since the same amount of down-tilt would typically be applied for each polarization. Each output of the phase shifters 450 is coupled to either a radiating element 422 or a sub-group 424 of radiating elements 422 of the linear array 420 that is associated with the phase shifter 450.

Each RET unit 430 is connected to a respective one of the phase shifters 450 via a mechanical linkage 440. As discussed above, each RET unit 430 may comprise, for example, a DC motor or a stepper motor that may move a rod or the like. In some cases, multiple RET units may share a single motor. The movement of the rod (or other element) by the motor is carried by the mechanical linkage 440 that is connected to the RET unit 430 to the wiper arm (or other component) of the one (or more) of the electromechanical phase shifters 450. Thus, each RET unit 430 may provide the mechanical action that adjusts the associated phase shifters 430 in order to apply a phase taper to the radiating elements 422 of a linear array 420 that act to change the tilt of antenna beam formed thereby.

As is further shown in FIG. 5, each RET unit 430 is coupled to the RET controller 460. The RET controller 460 may comprise, for example, an integrated circuit chip that is mounted on a printed circuit board 410 such as, for example, an application specific integrated circuit (ASIC) chip or a standard processor integrated circuit chip. In some embodiments, each RET unit 430 may be connected to a pair of output ports of such a RET controller chip 460 via a pair of wires such as, for example, a cable that includes two insulated conductors. Control signals may be transmitted from the RET controller chip 460 to each RET unit 430 over these respective wire pairs in order to control operation of the RET units 430. The communications between the RET controller chip 460 and the RET units 430 may comprise serial communications in some embodiments, and may be transmitted using any appropriate protocol/interface such as, for example, RS-485, SPI, I²C or by voltages that are input directly to the RET units 430.

As is further shown in FIG. 5, each control port 470 is coupled to the RET controller 460. As noted above, in some embodiments, the RET controller 460 may be an integrated circuit chip that is mounted on a printed circuit board 410 and each control port 470 may comprise, for example, an RS-485 connector that has a first end that is accessible from outside the antenna 400 that is configured to receive a connectorized RS-485 cable and a second end that is mounted on the printed circuit board 410. It will be appreciated, however, that other connectors or interfaces may be used to implement the control ports 470. For example, in some embodiments, the control signals may be transmitted from the AISG Primary 116 to the antenna 400 over a coaxial cable or other RF transmission line along with the RF signals. Such coaxial cables are typically connected to coaxial connectors that are mounted on the base plate of the antenna housing so that the RF signals may be transmitted between the base station equipment 110 and the antenna 400. In such embodiments, a first smart bias tee may be provided at the base of the antenna tower that is used to couple the control signals onto the RF transmission line and, as is discussed above with reference to FIG. 8, a second smart bias tee may be included in the antenna 400 that is used to couple the control signals from the RF transmission path to the RET controller 460.

The RET controller 460 passes control signals between the control ports 470 and the RET units 430. The RET controller 460 may route the signals according to configuration data. The configuration data may be changed to reconfigure the control paths in the manner discussed above. In some embodiments, the reconfiguration data may be provided to the RET controller using an AISG command.

In the description above, the RET controllers (e.g., RET controller 460) and the RET units (e.g., the RET units 430) have been described and shown in the accompanying figures as being separate units. It will be appreciated that the RET controllers and RET units may also be implemented as a single integrated unit (e.g., all of the components are contained within a single housing) and that multiple mechanical linkages may extend between this integrated unit and multiple phase shifters. Thus, while the RET controllers and RET units are generally described as being separate units, it will be realized that they can be integrated as standalone units or as a single integrated unit without departing from the scope of the present invention. Thus, an integrated unit that performs the functionality of a RET controller and a RET unit comprises both a RET controller and a RET unit, even though they may be combined together and implemented as a single unit.

It will also be appreciated that multi-RET units are known in the art in which a plurality of RET units share a common drive motor. For example, U.S. Provisional Patent Application Ser. No. 62/350,252, filed Jun. 15, 2016 ("the '252 application"), discloses various multi-RET units in which a plurality of RET units share one or more motors. The '252 application is incorporated herein by reference. Herein, a RET unit refers to a device that may be used to move a component of a phase shifter. Thus, for example, an integrated unit that uses one or more shared motors to independently drive multiple mechanical linkages such as the multi-RET units of the above-referenced '252 application is considered to comprise a plurality of RET units for purposes of the present application. Likewise, when a plurality of RET units and a RET controller are implemented as a single integrated unit in the manner discussed above the antenna is still considered to have a plurality of RET units, even though they are integrated together.

Figure 6:
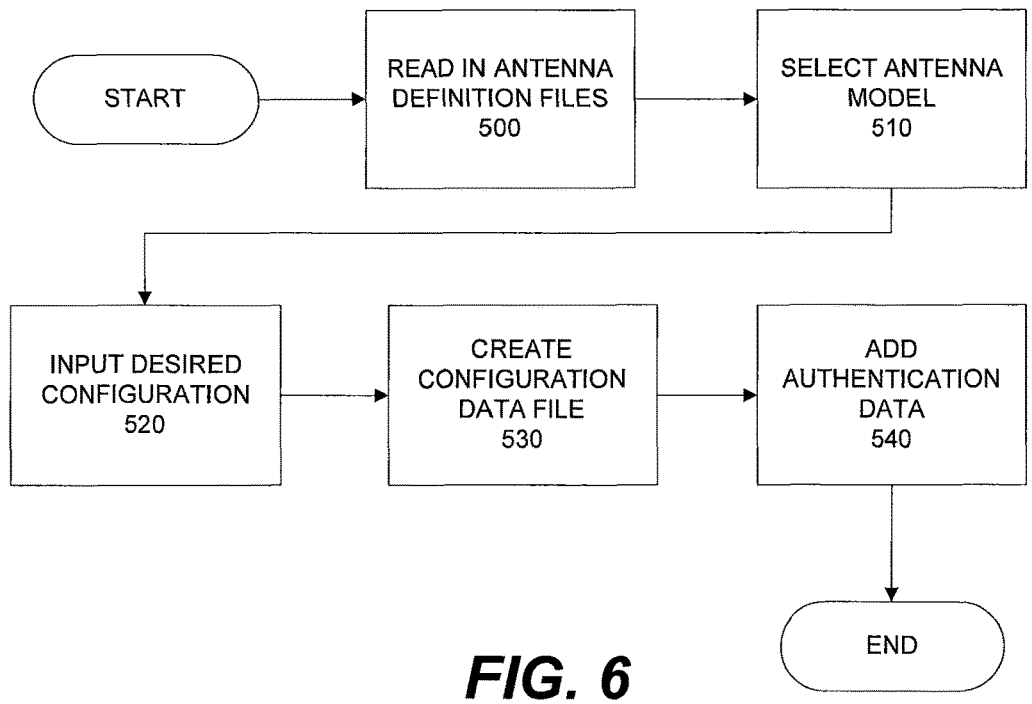
FIG. 6 is a flow chart illustrating a method of creating a configuration file according to embodiments of the present invention.

FIG. 6 is a flow chart illustrating a method of creating a configuration data file according to embodiments of the present invention. This configuration data file may be created and uploaded to a base station antenna by, for example, a network operator in order to reconfigure the connections between the RET units and the control ports on the base station antenna.

As shown in FIG. 6, operations may begin with an operator reading at least the relevant antenna data into a computer program (block 500). The computer program may be run, for example, on a personal computer and may be designed to facilitate allowing an operator to select a RET unit-to-control port configuration for a specific base station antenna. In some cases, the antenna data for internal RET-based antennas that support reconfiguration may be read into the computer program, while in other cases only the antenna data for the specific antenna design at issue may be read into the computer program. It will also be appreciated that the antenna data may be pre-loaded into the computer program in some cases. The antenna data for a particular antenna may include information regarding the number of control ports (e.g., AISG connections) and the number of RET units included in the antenna, as well as the association between the RET units and the specific arrays of radiating elements.

An operator may then run the computer program and select a specific type (e.g., model number) of antenna (block 510). Next, the operator may use, for example, a graphical user interface to define the desired configuration between the RET units and the control ports for the specific antenna that was selected (block 520). Once the desired configuration has been selected, the computer program may generate a small binary file or other data file that may later be encapsulated as the payload of an AISG command (block 530). As part of this file creation process, authentication data may be added to the data file that the base station antenna may use to confirm the authenticity of the data file (block 540).

Figure 7:
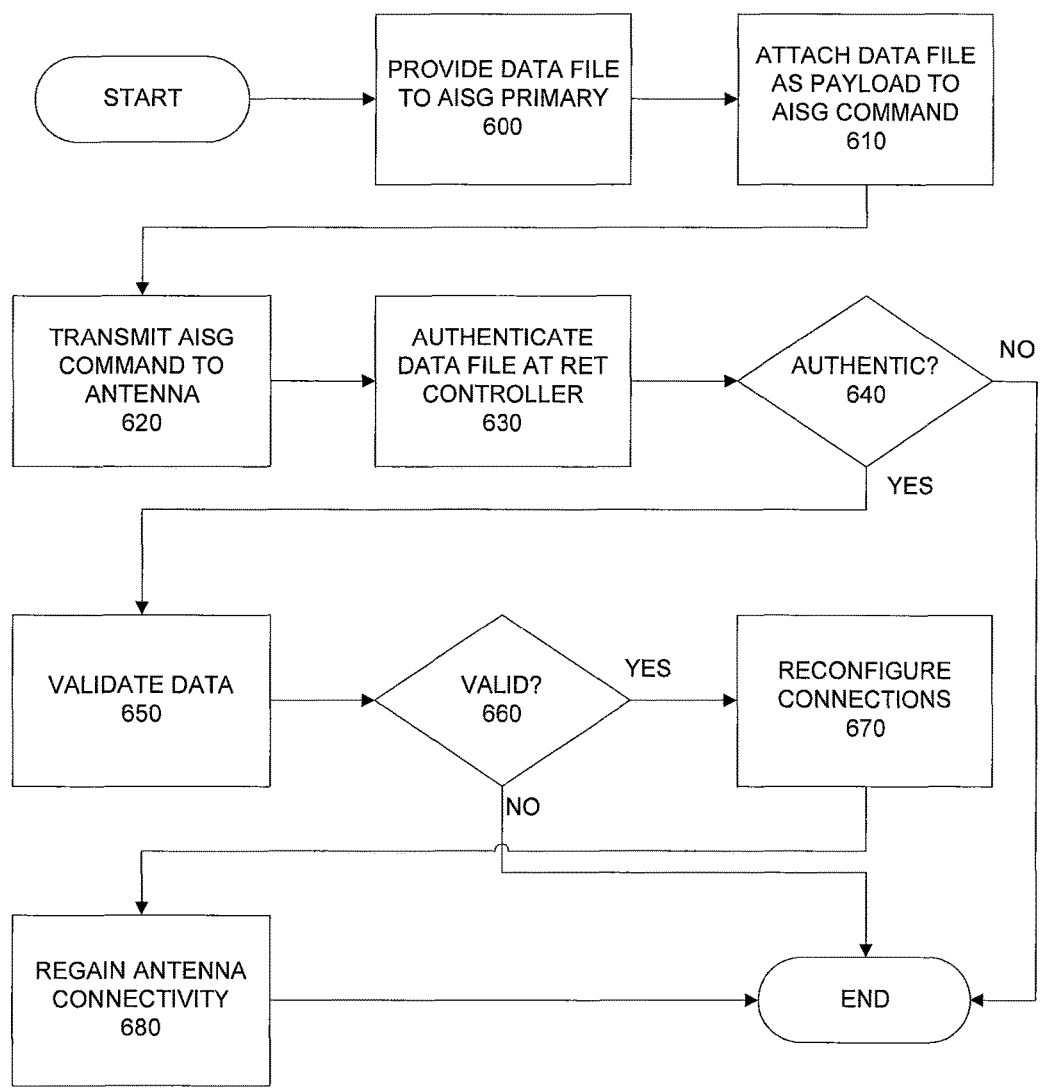
FIG. 7 is a flow chart illustrating a method of reconfiguring the connections between RET units and control ports of a base station antenna according to embodiments of the present invention.

FIG. 7 is a flow chart illustrating a method of reconfiguring the connections between RET units and control ports of a base station antenna according to further embodiments of the present invention. The base station antenna may be reconfigured according to embodiments of the present invention at the factory, at the cellular base station, or from a network operations center or other remote location. In each case, the same general technique may be used to perform the reconfiguration.

As shown in FIG. 7, operations may begin with data such as the data file discussed above with reference to FIG. 6 being provided to an AISG Primary that is associated with the base station antenna that is to be reconfigured (block 600). An operator may then cause the AISG Primary to transmit the data file as, for example, the payload of an AISG command to the base station antenna at issue (blocks 610, 620). The RET controller of the base station antenna receives the data file and reviews the authentication information contained therein (block 630). If the RET controller determines that the data file is not authentic (block 640), then operations may cease. If the RET controller determines that the data file is authentic (block 640), then the RET controller validates the data against the stored data regarding the hardware configuration for the base station antenna (block 650). If the data is not correct (i.e., it does not correspond to the actual hardware configuration of the base station antenna), then operations may end (and while not shown in FIG. 7, an error message may be sent to the AISG Primary). If the data is correct, then the RET controller may proceed to reconfigure the RET unit-to-control port connections on the antenna to the configuration specified in the data file (block 670). Once the reconfiguration is completed, the AISG Primary may reestablish connectivity with the antenna (block 680).

There may be an increasing trend toward reconfiguring the control port-to-RET unit connections in base station antennas. One driver of this trend is the increasing use of remote radio heads, which are commonly used on antennas that provide LTE service. Before the advent of remote radio heads, most cellular base stations included a single AISG Primary which controlled all of the RET units on the antenna, regardless of the number of linear arrays included on the antenna and/or the number of radios communicating through the antenna. With LTE service, reconfigurations may occur much more frequently and improved performance may be obtained when the RET units for the linear arrays that are driven by the LTE remote radio heads are directly controlled by an AISG Primary that may be integrated in one of the remote radio heads.

A second driver is the increasing use of site sharing antennas, which refer to an antenna that is used by two (or more) different network operators. As the number of linear arrays included on base station antennas increases, site sharing is becoming more commonplace. By way of example, a first network operator may install and use all of the linear arrays on a particular base station antenna. The network operator may, for example, use a single AISG Primary to control all of the RET units on the antenna. Later, the network operator may upgrade an adjacent cellular base station to provide enhanced service or add a new cellular base station, which may eliminate the need for use of one or more of the linear arrays on the originally-installed antenna. In such a circumstance, the network operator may choose to lease the linear array and associated equipment (e.g., radios, etc.) to a second network operator. For a wide variety of reasons, it is not practical for two different network operators to share an AISG Primary. Thus, when the linear array (and its associated RET unit) is leased to the second network operator, it may be necessary to reconfigure the connections in the antenna so that the second network operator may control the leased RET unit through its own separate AISG Primary.

The base station antennas according to embodiments of the present invention may exhibit a number of advantages over conventional base station antennas. As discussed above with reference to FIG. 3, in some conventional base station antennas, the number of RET controllers must be equal to the number of different AISG Primaries that are used to control RET units on the antenna. Thus, if an antenna communicates with two, three or four AISG Primaries, the antenna would need to have a corresponding number (i.e., 2, 3 or 4) of RET controllers. This increases the cost of the antenna and may require a larger controller printed circuit board. In contrast, the antennas according to embodiments of the present invention may use a single RET controller, regardless of the number of AISG Primaries that control operations of the antenna.

As another example, when a network operator must select an antenna that has a control port-to-RET unit configuration that matches the equipment available at a particular cellular base station, it becomes necessary for network operators to inventory antennas with a large number of different configurations. This may increase inventory and storage requirements and have other negative consequences. With the antennas according to embodiments of the present invention, each base station antenna of a particular type may have the exact same control port-to-RET unit configuration which can be reconfigured by the network operator as needed. In some cases, the network operator may request that different antennas be pre-configured in different ways to minimize the number of re-configurations that must be performed by the network operator.

Moreover, as base station antennas become increasingly complex with the proliferation of new frequency bands and services coupled with the need to continue to support existing frequency bands and services, the frequency with which reconfiguration may be required is expected to increase significantly. As noted above, while reconfigurable antennas are available, they can only be reconfigured by directly connecting a computer to the antenna, which typically requires that a technician climb the antenna tower to perform the reconfiguration. The base station antennas according to embodiments of the present invention may eliminate the need for any such tower climb.

It will be appreciated that numerous modifications may be made to the above disclosed example embodiments. For example, while in the above-described embodiments the reconfiguration data is uploaded to the antenna using AISG Command No. 0x32 and/or 0x89, it will be appreciated that other AISG commands or other communications could be used in other embodiments. Thus, it will be appreciated that the embodiments disclosed herein are merely provided as examples to ensure that the concepts of the present invention are fully disclosed to those of skill in the art.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

All embodiments can be combined in any way and/or combination.

That which is claimed is:

1. A method of configuring a base station antenna, the method, comprising:
   using an Antenna Interface Standards Group (AISG) 2.0 command to transmit reconfiguration data to a controller of the antenna from a remote location; and
   reconfiguring connections between a plurality of remote electronic tilt (RET) units that are mounted within the antenna and a plurality of control ports of the antenna in response to receipt of the reconfiguration data.

2. The method of claim 1, wherein the reconfiguration data is contained within a data file attached to the AISG 2.0 command.

3. The method of claim 1, wherein the reconfiguration data is transmitted to the controller of the antenna through an Antenna Interface Standards Group Primary.

4. The method of claim 1, wherein the remote location is a network operator network control center.

5. The method of claim 1, wherein the control ports comprise RS-485 connectors.

6. The method of claim 1, wherein the remote location is the bottom of a tower on which the antenna is mounted.

7. The method of claim 1, wherein the controller is a RET controller that controls operation of the RET units.

8. The method of claim 7, wherein the antenna includes a single RET controller.

9. The method of claim 1, wherein the AISG 2.0 command comprises AISG 2.0 command number 0x32, AISG 2.0 command number 0x89 or AISG command numbers 0x40, 0x41 and 0x42.

10. The method of claim 1, further comprising validating the authenticity of the AISG 2.0 command prior to reconfiguring the connections between the motorized RET units and the control ports.

11. The method of claim 1, wherein the plurality of RET units comprises an integrated unit that includes a shared motor.

12. A base station antenna, comprising:
   a first linear array of radiating elements;
   a second linear array of radiating elements;
   a first phase shifter having outputs that are coupled to respective individual or sub-groups of the radiating elements of the first linear array;
   a second phase shifter having outputs that are coupled to respective individual or sub-groups of the radiating elements of the second linear array;
   a plurality of control ports;
   a first RET unit;
   a second RET unit; and
   a RET controller, the RET controller configured to receive an Antenna Interface Standards Group (AISG) control signal and reconfigure at least one of a first control path between the first RET unit and the plurality of control ports and a second control path between the second RET unit and the plurality of control ports in response thereto,
   wherein the AISG control signal comprises an AISG 2.0 command.

13. The base station antenna of claim 12, wherein the control ports comprise RS-485 connectors.

14. The base station antenna of claim 12, wherein the AISG control signal comprises AISG 2.0 command number 0x32, AISG 2.0 command number 0x89 or AISG command numbers 0x40, 0x41 and 0x42.

15. The method of claim 1, wherein at least one of the control ports comprises a control output port of a smart bias tee.

16. The base station antenna of claim 12, wherein at least one of the control ports comprises a control output port of a smart bias tee.

17. The base station antenna of claim 12, wherein the first and second RET units share a common motor.

18. A base station antenna, comprising:
   a first linear array of radiating elements;
   a second linear array of radiating elements;
   a first phase shifter having outputs that are coupled to respective individual or sub-groups of the radiating elements of the first linear array;
   a second phase shifter having outputs that are coupled to respective individual or sub-groups of the radiating elements of the second linear array;
   a plurality of control ports;
   a first RET unit;
   a second RET unit; and
   a RET controller, the RET controller configured to receive an Antenna Interface Standards Group (AISG) control signal and reconfigure at least one of a first control path between the first RET unit and the plurality of control ports and a second control path between the second RET unit and the plurality of control ports in response thereto,
   wherein the RET controller comprises an integrated circuit chip having a plurality of output pins, wherein the RET controller is coupled to each of the control ports through the output pins.

* * * * *